Jan. 30, 1962   W. SCHROEDER ETAL   3,018,697
COUNTERBALANCE CONTROL DEVICE
Filed Jan. 7, 1959
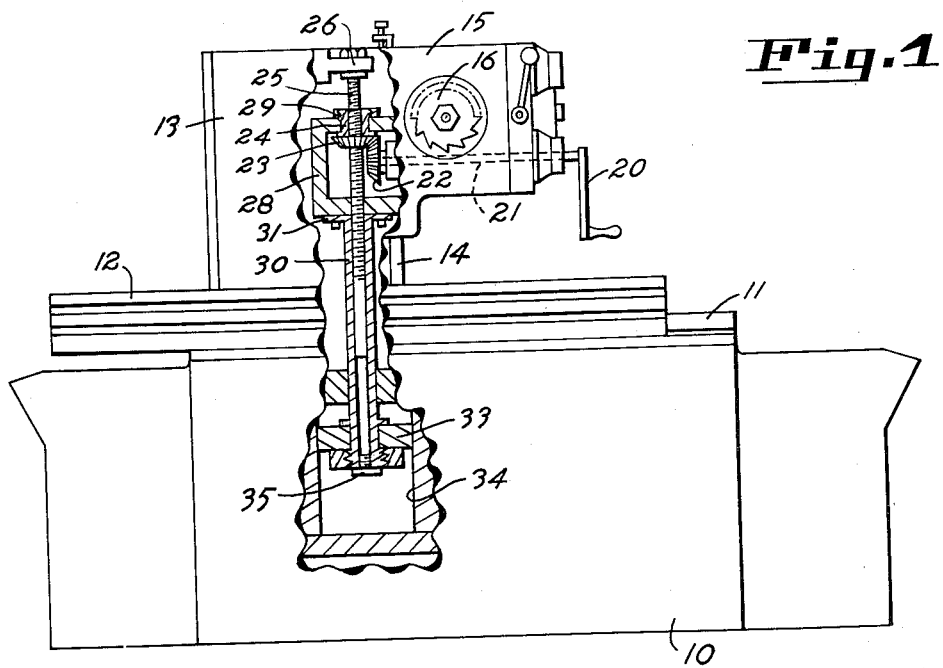
*Fig.1*
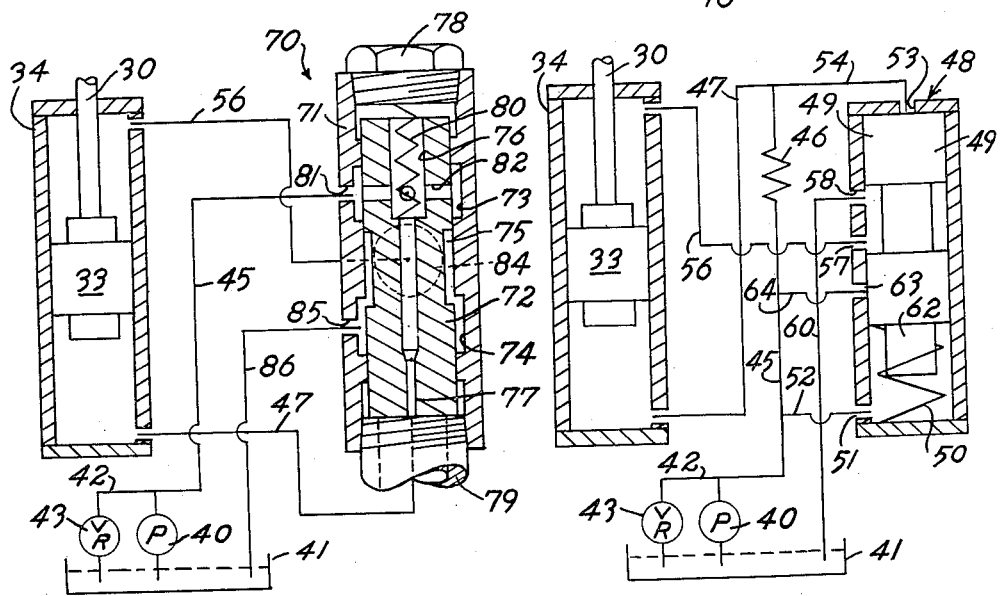
*Fig.3*   *Fig.2*
INVENTORS.
WALTER SCHROEDER.
ALBERT H. DALL.
BY
ATTORNEYS.

3,018,697
Patented Jan. 30, 1962

3,018,697
COUNTERBALANCE CONTROL DEVICE
Walter Schroeder and Albert H. Dall, Cincinnati, Ohio, assignors to The Cincinnati Milling Machine Co., Cincinnati, Ohio, a corporation of Ohio
Filed Jan. 7, 1959, Ser. No. 785,428
10 Claims. (Cl. 90—16)

This invention relates to a counterbalance for machine tools or like structures and has for its principal purpose the provision of means for removing the counterbalancing force when the counterbalanced member is moved in a downward direction.

In machine tool structures it is customary to counterbalance vertically movable slides so as to reduce both the power required to move the slides and also the wear resulting on the driving mechanism due to the higher forces caused by the unbalanced weight of the slides. In certain instances, counterbalancing is also useful in eliminating the lost motion or backlash present in the driving mechanism whereby the accuracy and utility of the machine tool may be considerably improved. For example, in a machine tool structure wherein a vertically movable spindle carrier is utilized for adjusting the height of the cutter above the worktable or bed of the machine, it is desirable to over-counterbalance the carrier so that the backlash in the adjusting mechanism is taken up in an upward direction. Then, when an upward thrust is produced on the carrier by engagement of the cutter with the work, the carrier will be "solid," that is, no upward movement of the carrier will be permitted to occur due to backlash in the adjusting mechanism. The amount of over-counterbalancing provided must, of course, be sufficient to overcome the friction of the slide along its ways in order to insure that the backlash will be taken out as desired. Hence, an upward thrust must be provided by the counterbalance which is greater than the weight of the slide. This force assists the upward movement of the slide during adjustment of cutter height but seriously interferes with downward adjusting movement since the downward force must be sufficient to overcome both the amount of the over-counterbalancing force and also the resistance to movement due to the friction of the slide along its ways. Therefore, the operator may find it very difficult and tiresome to crank the carrier down by hand unless some means is provided for removing the upward thrust produced by the counterbalance during such downward movement of the slide.

It is, therefore, an object of the present invention to provide an automatically operable device for removing the upward counterbalancing force on a machine tool slide when the adjusting mechanism is operated to lower the slide.

Another object of the invention is to provide a simple circuit for automatically controlling a fluid pressure counterbalance in response to the pressure drop produced across a flow resistance element in the fluid circuit.

Another object of the invention is to provide a novel control valve and circuit for applying equal pressures to both sides of a fluid pressure counterbalance in response to the pressure drop resulting across a flow resistance element in the circuit.

With these and other object in view, which will become apparent from the following description, the invention includes certain novel features of construction and combinations of parts, the essential elements of which are set forth in the appended claims, and a preferred form or embodiment of which will hereinafter be described with reference to the drawings which accompany and form a part of this specification.

In the drawings:

FIG. 1 is a front elevation of a machine tool with parts broken away to illustrate the counterbalancing mechanism.

FIG. 2 is a diagrammatic view of a fluid pressure counterbalancing system incorporating the present invention.

FIG. 3 is a diagrammatic view showing another form of the novel counterbalancing system.

Similar reference characters designate similar or identical elements and portions throughout the following specification and throughout the different views of the drawings.

In FIG. 1 of the drawings is shown a production-type fixed-bed milling machine to which the teachings of the present invention may be applied with advantageous results. As shown in the drawing, the milling machine includes a bed 10 provided with horizontal ways 11 which support a table 12 for longitudinal sliding movement on the bed 10. At the rear of the machine, the bed 10 is provided with an upstanding column 13 on which are provided vertically extending ways 14 for supporting a spindle carrier 15 for vertical sliding movement relative to the bed 10. The spindle carrier may be of conventional design and contain the usual variable speed driving mechanism for a milling cutter 16 mounted on a spindle journaled in the carrier 15. The workpiece to be machined is clamped to the table 12 so that it may be fed beneath the cutter 16 to remove material from the top of the workpiece.

In the machine herein illustrated, the spindle carrier 15 is adapted for manual adjustment along the ways 14 to permit the cutter 16 to be set to the proper height relative to the workpiece. For this purpose, the spindle carrier is provided with a hand crank 20 mounted on one end of a shaft 21 journaled for rotation in the spindle carrier 15. The other end of the shaft 21 has secured thereto a bevel gear 22 which meshes with another bevel gear 23 secured to one end of a nut 24. The nut 24 is provided with internal screw threads which mesh with corresponding threads provided on a screw 25. The screw is fastened at its upper end to a lug 26 attached to the column 13 whereby the screw is maintained stationary with respect to the bed of the machine.

The external surface of the nut 24 is cylindrical in shape and is journaled for rotation in a suitable bore provided therefore in a bracket 28 carried by the spindle carrier 15. The nut is held in place on the bracket 28 by a retainer 29 which is screwed onto the end of the nut or otherwise suitably fastened thereon.

From the foregoing description it will be understood that when the hand crank 20 is turned, the nut 24 will be rotated thereby feeding the spindle carrier up or down along the screw 25 depending upon the direction of rotation of the handle 20.

The spindle carrier 15 is counterbalanced by a cylinder and piston arrangement which is operatively connected to the spindle carrier in the manner indicated in FIG. 1 of the drawings. As therein shown, a tubular member 30 is provided at its upper end with a flange 31 which is secured by bolts to the under side of the bracket 28. The lower end of the screw 25 is slidably received within the tube 30 thereby permitting free movement of spindle carrier and tube relative to the stationary screw. At its lower end, the tube is secured to a piston 33 working in a cylinder 34 which is attached to the bed 10. The lower end of the tube 30 is closed by a plug 35 to prevent pressure fluid in the cylinder from escaping up the tube. Hence, by supplying fluid under a suitable pressure to the bottom portion of the cylinder 34, beneath the piston 33, it is possible to provide an upward force on the spindle carrier 15 which is sufficient to overcome the weight of the carrier and the friction thereof on the ways 14. Thereby any backlash between the screw 25 and the nut 24 will be removed in an upward direction. By so doing the cutter 16 will be held firmly against upward displacement when it takes a cut across the top of a workpiece carried on the table 12.

With this arrangement, the hand crank 20 may be easily turned in a direction which will cause elevation of the spindle carrier 15 since the counterbalancing force applied by the cylinder 34 is sufficient to move the spindle carrier upward except for the restraining force exerted by the nut 24. However, when the hand crank is turned in the opposite direction to lower the spindle carrier to a new position for set up purposes, the situation is reversed and both the excess counterbalancing force and the friction of the carrier on the ways 14 must be overcome in order to move the carrier down. The hand crank is therefore difficult to turn in this direction and considerable manual effort is required in order to move the carrier any considerable distance in the downward direction. Small movements of the carrier in the downward direction for accurate positioning of the spindle carrier presents no particular problem since the amount of effort required is small despite the upward thrust of the counterbalance which must be overcome.

It is the purpose of the present invention to remove this difficulty by causing equal pressures to be applied to both sides of the piston 33 when the hand crank 20 is turned rapidly in a direction to lower the carrier 15 along the ways 14. One means for accomplishing this result is shown in FIG. 2 of the drawings. As shown in this figure, fluid pressure is applied to the underside of the piston 33 by a pump 40 which may be driven by an electric motor in the conventional manner. The pump withdraws fluid from a reservoir 41 and delivers it to a pressure line 42 which is connected by a relief valve 43 back to reservoir. The pressure in line 42 will thereby be determined by setting of the relief valve to maintain a substantially constant pressure in this line. Line 42 is connected through a line 45, a resistance 46 and a line 47 to the bottom of the cylinder 34 to apply the desired upward pressure on the piston 33. To remove the counterbalancing force from the piston 33 when the hand crank 20 is turned in a direction to move the piston downward in the cylinder 34 there is provided a valve 48 which cooperates in a novel manner with the resistance 46 to achieve the desired result. As shown in FIG. 2, the valve 48 is provided with a spool 49 which is urged upwardly as viewed in FIG. 2 by a compression spring 50. As shown, both ends of the valve are closed and both ends of the spool 49 are made subject to the pressure of the fluid in the line 45. Thus, the lower end of the valve is connected to the line 45 by a port 51 which is connected by a line 52 with the line 45. The opposite end of the valve is provided with a port 53 which is connected by a line 54 with the line 47 which connects with the bottom end of the cylinder 34. Under static conditions there will be no pressure drop across the resistance 46 so that the pressure in line 47 will be equal to that in line 45. Hence, both ends of the spool 49 are subjected to the same pressure and since equal diameters are presented by the spool to the fluid pressure in the opposite ends of the valve, the spring 50 will normally maintain the spool in the position shown in FIG. 2. In this position of spool, the upper end of the cylinder 34 is connected to reservoir by a line 56 connected to a port 57 on the valve which in turn is comunicatively connected with a port 58 connected by a line 60 with reservoir 41. Hence, under these conditions, the pressure on the upper side of the piston 33 is zero while the pressure acting on the bottom side thereof is equal to the pressure in the line 45. Thus a counterbalancing force of desired proportions is applied to the spindle carrier to urge it upwardly and take up the backlash as previously mentioned. If however, the hand crank 20 is turned rapidly in a direction to force the piston 33 downward in the cylinder 34, the pressure in line 47 will be increased due to the pressure drop across the resistance 46 and sufficient pressure will be applied to the top end of the spool 49 to overcome the force of the spring 50 and move the spool downward to the extent permitted by a tenon 62 on the lower end of the spool which limits downward movement of the spool by contact with the bottom of the valve. As the spool moves downwardly, the reservoir line 60 is cut off and the port 57 of the valve is connected with a port 63 which is connected by a line 64 with the pressure line 45. Hence, fluid under pressure from the line 45 will be delivered through line 64, port 63, port 57, and line 56 to the upper end of the cylinder 34. Since the lower end of the cylinder is permanently connected to the pressure line 45 through the resistance element 46, the pressure in each end of the cylinder now will be substantially the same so that the counterbalancing force is effectively overcome and the spindle carrier may easily be cranked down since its own weight assists the operator in such movement. When the operator ceases to turn the hand crank 20, the pressures on the opposite ends of the spool 49 will again become equal so that the spring 50 will be able to return the spool to the position shown in FIG. 2 and thereby restore the counterbalancing force to the spindle carrier. Small movements of the handwheel to effect final or exact positioning of the spindle carrier will not create sufficient pressure drop across the resistance 46 to move the valve spool and the counterbalancing force will not be removed. When the hand crank is turned in a direction to raise the spindle carrier, the valve 48 is not operated since in this case the pressure drop across the resistance 46 is such as to reduce the pressure on the upper end of the spool 49 thereby assisting the spring 50 in maintaining the spool in the upper position as shown in FIG. 2.

A further embodiment of the invention is shown in FIG. 3 of the drawings in which a valve 70 of somewhat different design is substituted in place of the valve 48 in the system of FIG. 2. In the system shown in FIG. 3, the principle of operation is the same as before the essential difference being that the resistance element 46 is incorporated within the valve itself thereby simplifying the external connections of the system.

As shown in FIG. 3, the valve 70 includes a valve body 71 which is provided with a cylindrical bore for slidably receiving a spool 72. The body 71 is provided with a pair of internally formed annular grooves 73 and 74 while the spool is provided with a centrally disposed annular groove 75. The spool is also provided with a longitudinally extending bore 76 which is of varying diameter being rather large at one end and reducing to a small channel 77 at the other end. The channel 77 constitutes a flow resisting element which takes the place of the resistance 46 shown in FIG. 2. One end of the valve body 71 is closed by a screw plug 78 while the other end is threaded to receive a fitting 79 to which the line 47 is connected as shown. The spool 72 is urged downwardly, as viewed in FIG. 3, by a compression spring 80 which is received in the upper end of the bore 76 and presses against the plug 78. Pressure from the line 45 is delivered to a port 81 which communicates with the groove 73 in the valve body. The spool is provided at this location with four radially extending bores 82 which communicatively connect the groove 73 with the bore 76 in the spool. In this manner pressure is delivered from the line 45 into the upper end of the valve and also through the resistance channel 77 to the line 47 connected with the bottom of the cylinder 34. Since the pressures on both ends of the spool are the same under static conditions of the load, the spring 80 will urge the spool into its lower position as shown in FIG. 3. In this position of the spool, the line 56 connected to the upper end of the cylinder 34 is connected with a port 84 formed in the body of the valve adjacent the groove 75 in spool which communicates with the groove 74 connected by port 85, and line 86 with the reservoir 41. Hence, the upper end of the cylinder is connected to reservoir and zero pressure is applied to the upper side of the piston 33 while the under side of the piston is subjected to the pressure in line 47 which is equal to that in the line 45 when the system is at rest. However, when the hand crank 20 is turned rapidly to move the piston 33 downward in the cylinder 34, pressure on the lower end of the spool 72 is increased due to the resistance of channel 77 and the spool is shifted upwardly to the extent permitted by the space between the upper end of the spool and the inner end of the plug 78. This movement of the spool is sufficient to disconnect groove 74 from groove 75 and to connect the latter groove with groove 73 which is connected, as previously noted, to the pressure line 45. Hence, pressure from line 45 will pass through port 81, groove 73, groove 75, port 84 and line 56 to the upper end of the cylinder 34. Hence, substantially equal fluid pressures are applied to both sides of the piston 33 and the counterbalancing force is effectively overcome. When movement of the hand crank 20 is stopped, the pressures on opposite ends of the spool 72 will again become equal and spring 80 will return the spool to its lowered position, as shown in FIG. 3, thereby again connecting line 56 with the reservoir line 86 while line 47 remains connected with pressure line 45 through the resistance channel 77. The counterbalancing force will thereby be restored to the spindle carrier as soon as the carrier has been lowered to the desired position and turning of the crank 20 has been stopped. It will be observed from the foregoing description that the desired object has been accomplished in a simple and effective manner and, while certain specific terms and language have been used herein in describing the invention, it is to be understood that the present disclosure is illustrative rather than restrictive and that changes and modifications may be resorted to without departing from the spirit of the invention as defined by the claims which follow.

What is claimed is:

1. In a machine tool structure having a support, a member mounted for vertical movement on said support, and means for moving said member on said support, the combination of means for counterbalancing said member including a pressure actuated device operatively connected between said member and said support, a source of pressure, a circuit connecting said source to one side of said device to cause the latter to apply to said member an upward counterbalancing force greater than the weight of said member, and means responsive to the downward movement of said member by said moving means for causing said circuit to connect the source of pressure to the other side of said device whereby substantially equal pressures will be applied to both sides of said device thereby removing the counterbalancing force supplied to said member by said device.

2. The machine tool structure of claim 1 wherein said circuit includes a flow restricting channel intermediate said source of pressure and said one side of said pressure actuated device.

3. The machine tool structure of claim 2 wherein said last-named means includes a valve responsive to the pressure drop across said channel for connecting said source to said other side of said device.

4. In a machine tool structure having a support, a member mounted for vertical movement on said support, and means for moving said member on said support, the combination of means for counterbalancing said member including a pressure actuated device operatively connected between said member and said support, a source of pressure, a valve connected to said source, a flow restricting channel associated with said valve for connecting said source of pressure to one side of said device to thereby cause said device to apply to said member an upward counterbalancing force greater than the weight of said member, an element in said valve movable to connect said source to the other side of said device, and means for applying the pressure drop produced across said channel upon downward movement of said member by said moving means to said valve element to move the same and connect said source to the other side of said device whereby substantially equal pressures will be applied to both sides of said device thereby removing the counterbalancing force applied to said member by said device.

5. The machine tool structure of claim 4 wherein said flow restricting channel extends longitudinally through said movable valve element and communicatively connects said source with said one side of said device.

6. The machine tool structure of claim 5 including means for normally biasing said valve element to a position in which said pressure source is disconnected by said valve from said other side of said device.

7. In a machine tool structure having a support, a member mounted for vertical movement on said support, and means for moving said member on said support, the combination of means for counterbalancing said member including a pressure actuated device operatively connected between said member and said support, a source of pressure, means connecting said source to one side of said device to apply to said member an upward force greater than the weight of said member, and means including a valve operating in response to downward movement of said member for connecting said source to the other side of said device thereby removing the counterbalancing force from said member and permitting unrestrained downward movement thereof by said moving means.

8. In a machine tool structure having a support, a member mounted for vertical movement on said support, and means for moving said member on said support, the combination of means for counterbalancing said member including a pressure actuated device operatively connected between said member and said support, a source of pressure, a first conduit connected to one side of said device, and a flow restricting channel connecting said conduit with said source of pressure to cause said device to apply to said member an upward counterbalancing force greater than the weight of said member, and means responsive to the downward movement of said member by said moving means to remove the counterbalancing force acting thereon, said means including a valve connected to said source of pressure, a second conduit connecting said valve to the other side of said device, and an element in said valve movable in response to an increase in pressure in said first conduit for connecting said second conduit to said source of pressure whereby substantially equal pressures are applied to both sides of said device thereby removing the counterbalancing force applied to said member by said device.

9. In a counterbalancing apparatus for a vertically movable member of a machine tool having a support on which the member is mounted, and actuating means for effecting movement of the member on the support, the combination of a pressure actuated device operatively connected between said member and said support, a source of pressure, a first circuit for connecting said source to one side of said device to cause said device to apply an upward counterbalancing force to said member, a second circuit, and means responsive to downward movement of said member by said actuating means for causing said second circuit to connect said source to the other side of said device whereby the substantially equal pressures applied to both sides of said device will remove the counterbalancing force and facilitate the downward movement of the member by said actuating means.

10. A counterbalance apparatus for a vertically movable member of a machine tool having a support on which the member is mounted and actuating means for effecting said movement, comprising a pressure actuated device operatively connected between said member and said support, and a source of pressure connected through a first circuit to one side of said device to cause said device to apply to said member an upward counterbalancing force greater than the weight of said member, a second circuit being provided and adapted to connect said source of pressure to the other side of said device when said actuating means imparts downward movement to said member, the substantially equal pressures on both sides of said device thereby removing the counterbalancing force supplied through said first circuit to said member by said device.

References Cited in the file of this patent
UNITED STATES PATENTS

| | | |
|---|---|---|
| 1,905,673 | Archea | Apr. 25, 1933 |
| 1,962,459 | Ostlund | June 12, 1934 |
| 2,027,706 | Schauer et al. | Sept. 11, 1934 |
| 2,571,049 | Meylich | Nov. 9, 1946 |